United States Patent
Conner et al.

(10) Patent No.: US 6,857,610 B1
(45) Date of Patent: Feb. 22, 2005

(54) POSITION ADJUSTABLE LOAD SUPPORT MECHANISM

(76) Inventors: John P. Conner, 1652 Angling Rd., Grandville, MI (US) 49418; Robert L. Russell, 1193-48$^{th}$ St. SE., Kentwood, MI (US) 49508

( * ) Notice: Subject to any disclaimer, the term of this patent is extended or adjusted under 35 U.S.C. 154(b) by 31 days.

(21) Appl. No.: 10/313,492

(22) Filed: Dec. 6, 2002

Related U.S. Application Data
(60) Provisional application No. 60/339,761, filed on Dec. 10, 2001.

(51) Int. Cl.$^7$ ................................................ F04G 3/00
(52) U.S. Cl. ............................... 248/284.1; 248/291.1; 248/917
(58) Field of Search .......................... 248/284.1, 286.1, 248/278.1, 280.11, 921, 276.1, 917, 919, 281.11

(56) References Cited

U.S. PATENT DOCUMENTS

| | | |
|---|---|---|
| 4,703,909 A | 11/1987 | Dayton et al. |
| 4,768,744 A | 9/1988 | Leeds et al. |
| 5,088,676 A | 2/1992 | Orchard et al. |
| 5,092,552 A | 3/1992 | Dayton et al. |
| 5,211,367 A | 5/1993 | Musculus |
| 5,743,503 A * | 4/1998 | Voeller et al. ............ 248/284.1 |
| 5,799,917 A * | 9/1998 | Li ............................. 248/284.1 |
| 5,947,429 A | 9/1999 | Sweere et al. |
| 6,012,693 A * | 1/2000 | Voeller et al. ......... 248/280.11 |
| 6,019,332 A | 2/2000 | Sweere et al. |
| 6,233,139 B1 | 5/2001 | Hamon |
| 6,269,958 B1 * | 8/2001 | Pollock et al. ................. 211/18 |
| 6,394,403 B1 * | 5/2002 | Hung ....................... 248/276.1 |
| 6,402,109 B1 | 6/2002 | Dittmer |
| 6,592,090 B1 * | 7/2003 | Li ............................. 248/284.1 |

* cited by examiner

Primary Examiner—Leslie A. Braun
Assistant Examiner—Tan Le
(74) Attorney, Agent, or Firm—Van Dyke, Gardner, Linn & Burkhart, LLP

(57) ABSTRACT

An improved mechanism for positioning loads of varying magnitudes, such as LCD displays, etc. The position of the load can be varied in height and angle according to the requirements of the user. The mechanism incorporates an adjustable sliding fulcrum, a support arm, a housing with four generally perpendicular channels, and a gas spring. The mechanism is initially manually adjusted for a particular load and then it automatically adjusts proportionally for the varying moments generated as the position of the load changes. The load is therefore evenly counterbalanced throughout its range of motion, and its position is maintained.

8 Claims, 7 Drawing Sheets

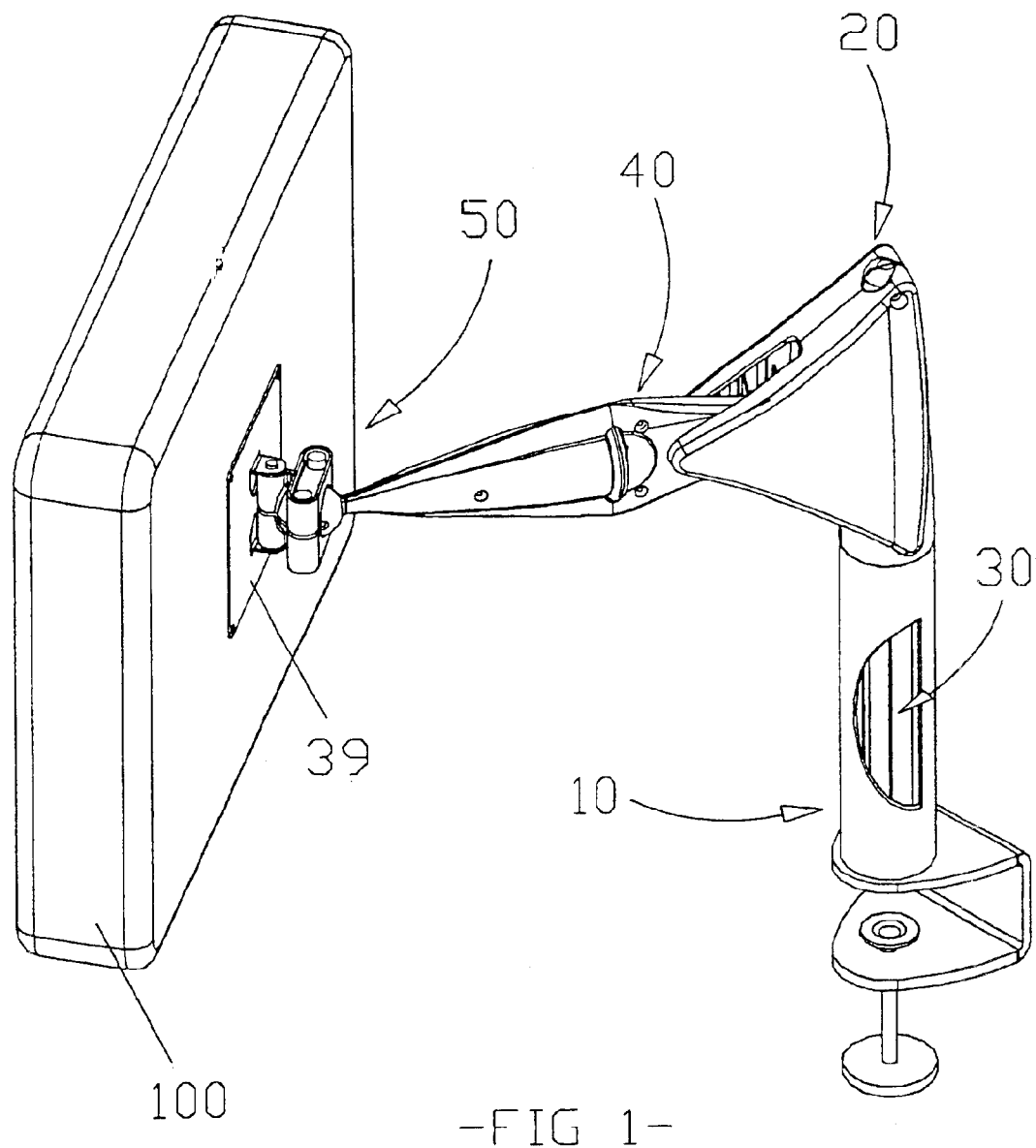
-FIG 1-

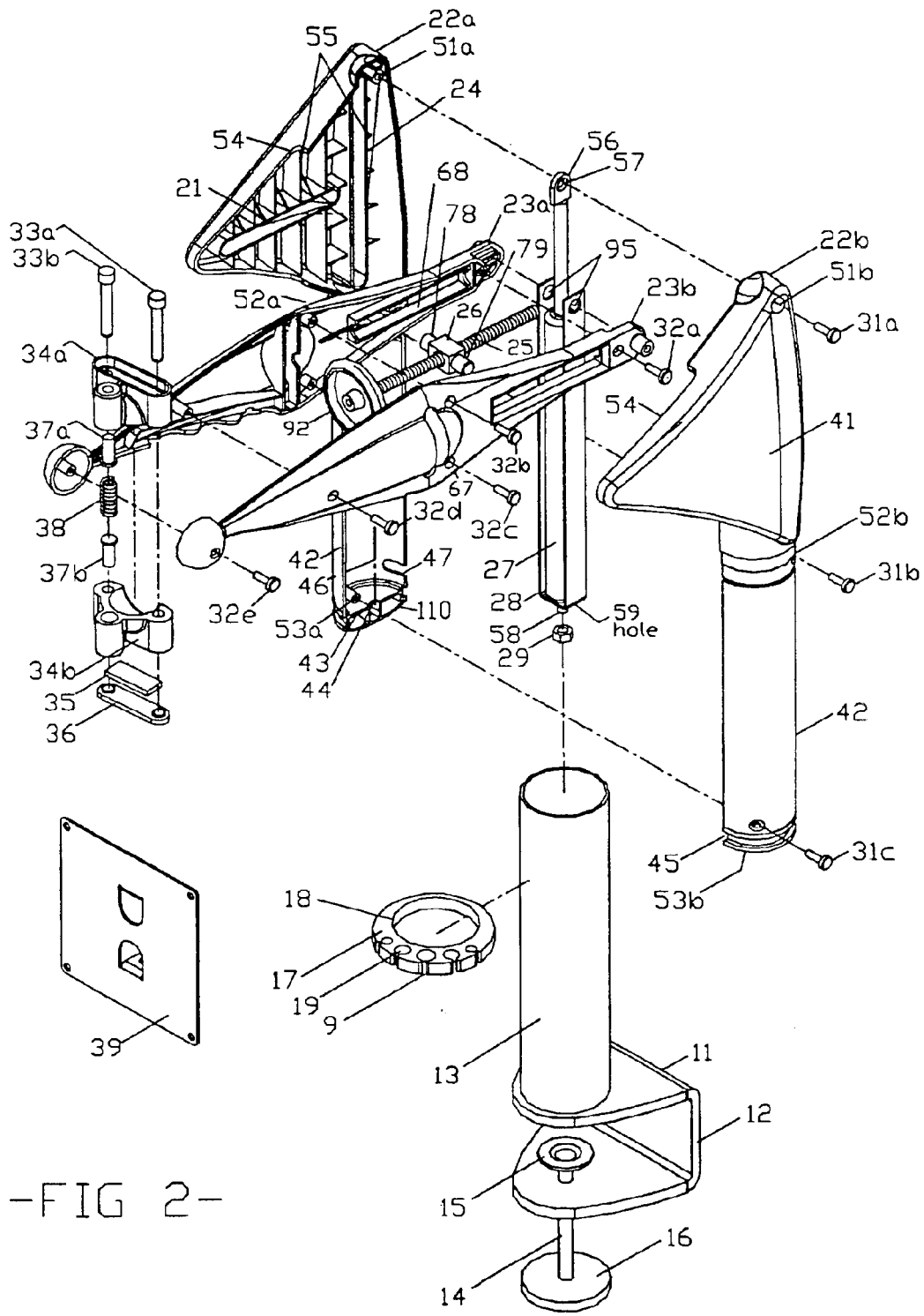
-FIG 2-

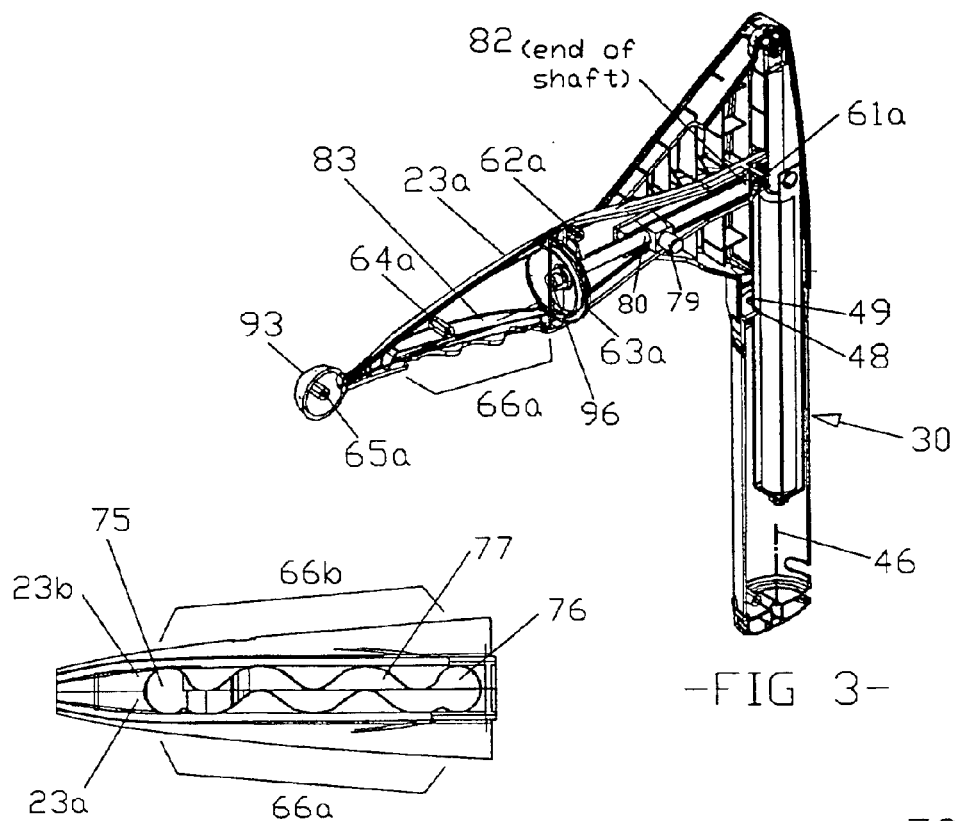
-FIG 3-
-FIG 4-
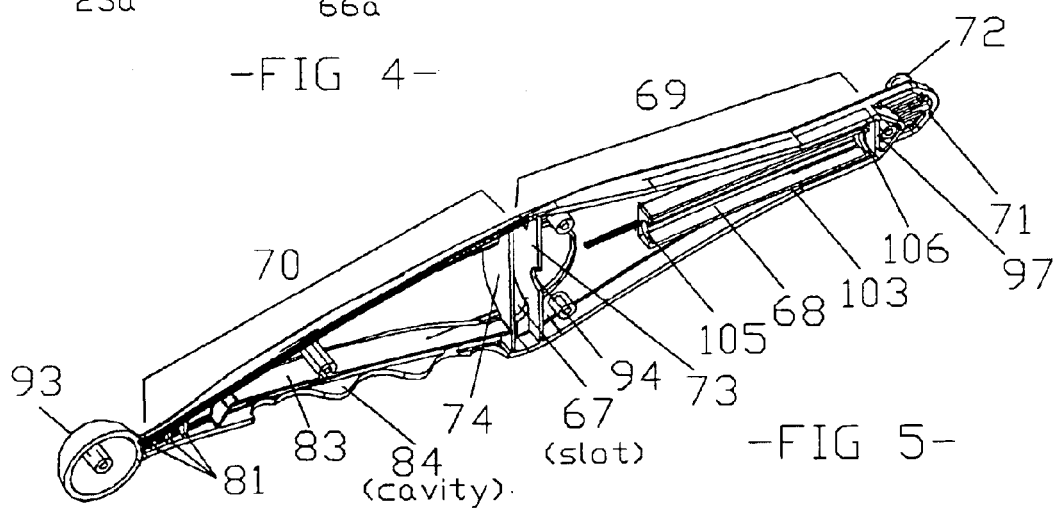
-FIG 5-

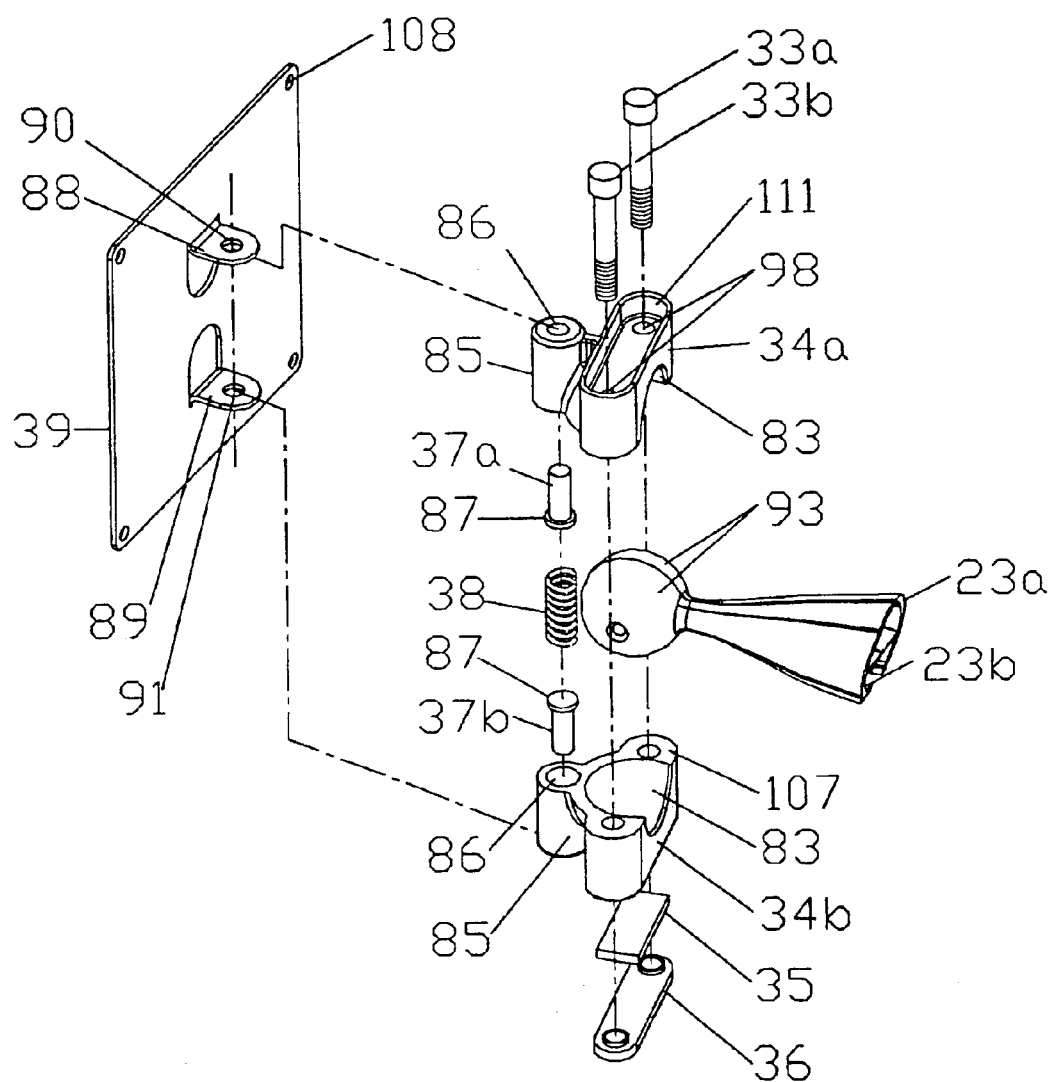
-FIG 6-

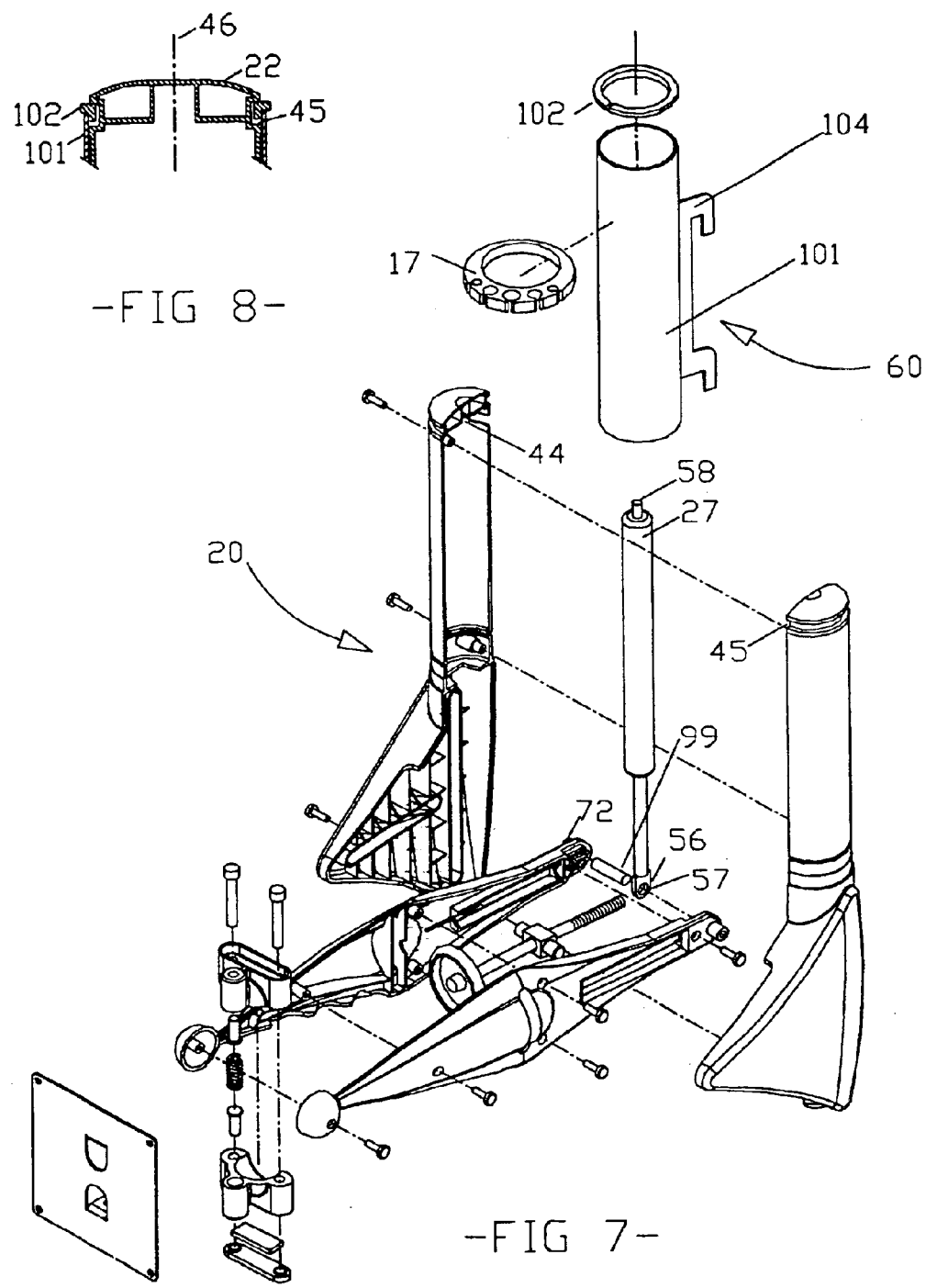
-FIG 8-
-FIG 7-

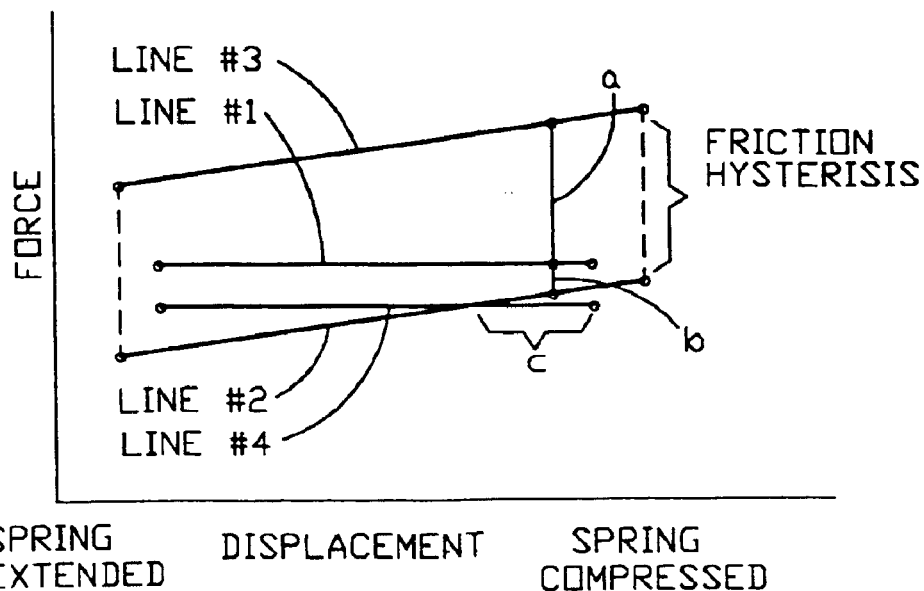
-FIG 9a-
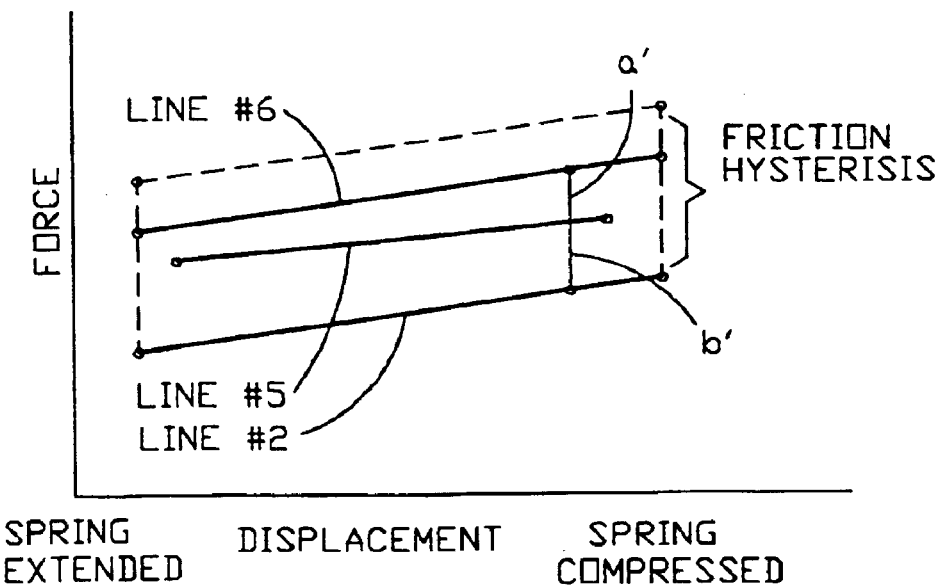
-FIG 9b-

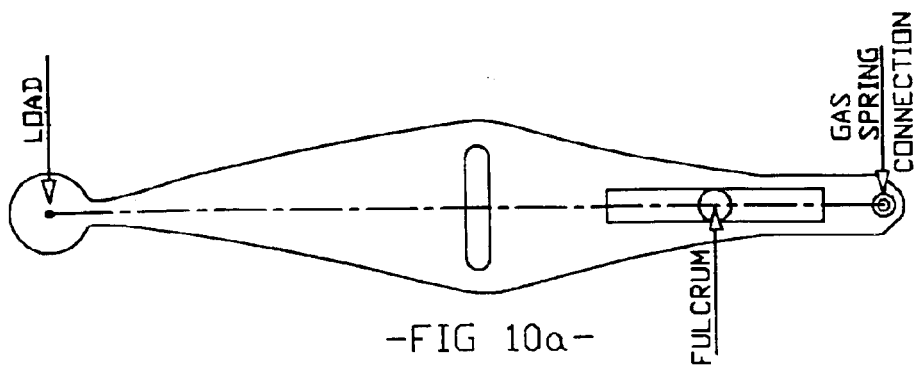
-FIG 10a-
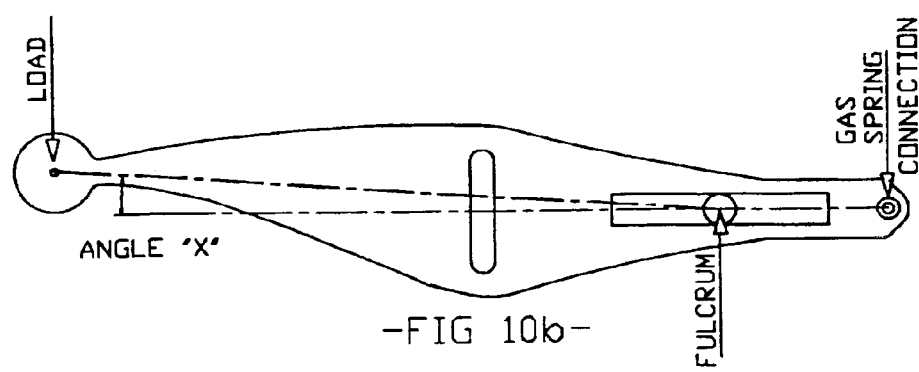
-FIG 10b-
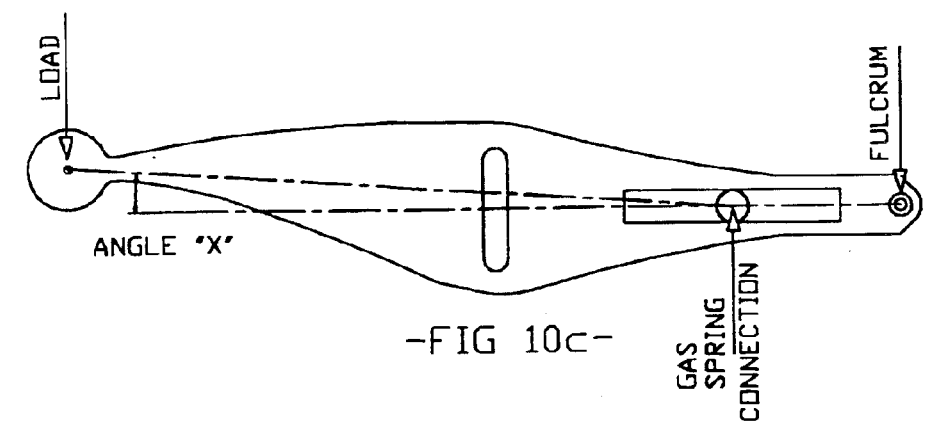
-FIG 10c-

POSITION ADJUSTABLE LOAD SUPPORT MECHANISM

This application claims priority to U.S. provisional application Ser. No. 60/339,761, filed Dec. 10, 2001, the disclosure of which is incorporated herein by reference.

BACKGROUND OF THE INVENTION

This invention relates to video display support mechanisms, specifically an improved position adjustable support for flat panel Liquid Crystal Displays (LCD), A worker at a typical computer terminal may be required to spend long hours in a somewhat constrained physical posture. In order to maintain user comfort and create the proper ergonomic position of the video display it is often necessary for the user to be able to adjust the position of his video display. Various prior art mechanisms have created devices that give the user this adjustability, however, these previous designs have inherent mechanical and functional shortcomings.

The typical prior art mounting systems contain various combinations of mounting brackets, support arms, friction locking knobs, ball gimbals, arcuate slots, mechanical springs, and gas springs. While the majority of these designs solve several of the typical usage problems, they are not very efficient support mechanism throughout their limited range of motion.

Typical single arm models such as described in prior art (U.S. Pat. No. 4,768,744 to Leeds) have their support arm pivot axis mounted in a low position near the users work surface. This has the effect of limiting the vertical adjustably range that the user might need. This is very important in a situation where the user has other furniture such as a keyboard support that has the ability to adjust to a standing height position. Due to this restriction this type of support mechanism is usually limited to supporting larger heavier CRT type displays.

A second typical prior art design (U.S. Pat. No. 6,019,332 to Sweere) incorporates a gas spring whose stored energy is used to counter balance the forces generated by the display. In this and numerous other existing devices the gas spring is mounted in a position such that its axis is at a relatively small distance from the pivot axis of the support arm and the angle to the axis of the support arm is relatively small. In these types of mechanisms the close proximity of the gas spring axis to the pivot axis of the arm requires the gas spring to exert very high forces to counter balance the weight of a typical display. These forces are in the range of 400–800 Newtons (N). These high forces limit the materials that can be used in the design of the highly stressed supporting components to various types of metals.

In order to calibrate this type of mechanism initially to provide the proper counter balance for the display, the user must adjust a bolt or screw with some type of tool such as a wrench or screw driver. This adjustment is generally difficult to accomplish due to the previously described high forces generated by the gas spring. This adjustment increases (or decreases) the distance from the axis of the gas spring to the pivot point of the arm, therefore increasing (or decreasing) the counter balance moment generated by the spring.

Since the distance from the axis of the gas spring to the axis of the arm pivot is relatively small, and the adjustment mechanism typically does not increase this distance significantly, the ratio of the heaviest loads that can be counter balanced to the lightest loads possible rarely exceeds 2 to 1. This can require that the user determine the weight of his display, and purchase a support mechanism with the correspondingly correct range of adjustability. This is evidenced in several existing products that are required to offer several models with different load range capabilities.

The design of the mechanisms that have the gas spring mounted generally parallel to the arm have an additional short coming in that the user is instructed to calibrate the counter balance while the support arm is in a horizontal position. It can be seen that through the range of articulation, the counter balancing force generated by the gas spring not only changes in magnitude, but also in direction. These changes produce a counter balancing moment that is continuously varying, with respect to the angle of the arm position and the internal characteristics of the gas spring. At the same time the moment generated by the load varies with the angle of the supporting arm. Trying to equate these two moments, as is necessary for a truly balanced condition, is very difficult, if not impossible. Since the counter balancing moments do not necessarily closely match the moments generated by the load, the load will tend to fade from the highest position toward the previously balanced horizontal position. Likewise, when the load is in the lowest position, it may be over balanced by the gas spring forces and it will tend to rise towards the horizontal position. In order to over come this inherent problem, many designs incorporate springs and polymer washers to increase the friction in the pivot areas. This in turn requires the user to apply much more force to reposition the load, because he must overcome the sum of the gas spring forces and the additional friction forces. These types of mechanisms do however operate adequately in a small range of motion.

In the previously mentioned prior art (Sweere), a second, manual adjustment in incorporated. This adjustment overcomes the small range of motion problem by allowing the user to access a more coarse adjustment through the use of a toothed ratchet mechanism. This in effect limits the counter balancing requirement placed on the gas spring to a smaller range of stroke.

SUMMARY OF THE INVENTION

Accordingly, my load support mechanism provides several advantages over the prior art. Included in these advantages is the mounting position of the arm pivot axis, which is located some distance above the user's working surface. This improved position allows the support arm to operate vertically through a much larger range of motion, which is very useful in the increasingly popular Sit to Stand user applications.

According to one aspect of the present invention, a position adjustable load support mechanism is provided that includes an arm, a channel, an attachment mechanism, and a force-producing device. The arm is supported at least partially by a movable fulcrum. The channel is adapted to constrain the movement of the fulcrum. The attachment mechanism allows a load to be attached to this arm. The arm, channel, fulcrum, and force-producing device are all arranged to create moments of force on the arm that automatically counterbalance each other over a plurality of different orientations of the arm.

In several prior art mechanisms, the gas spring is mounted with its axis relatively close to the pivot axis of the arm and at a small angle to the axis of the arm. This design has the inherent problem of requiring high counterbalancing forces from the gas spring, which in turn creates difficulty in adjusting the counterbalancing forces and limits the materials available for the heavily stressed components. One of the most significant aspects of the improved load support mechanism is the unique arrangement of the support arm, gas spring, and a horizontally adjustable fulcrum. This arrangement creates numerous mechanical and functional advantages. Since the distance between the axis of the gas spring and the adjustable fulcrum is relatively large compared to the prior art described previously, the force required from the gas spring to properly counter balance a load is much lower. A gas spring with a force in the 180–220N range is adequate to completely counter balance a typical video display. With this smaller counter balancing requirement two immediate advantages are evident, such as the ability to easily adjust the counter balance forces without the use of tools. A relatively small finger tip rotatable knob is adequate to adjust the position of the fulcrum and therefore change the counter balancing forces. The lower force requirement on the gas spring also allows many additional options in the design and material selection for the supporting components. The improved load support mechanism has a large portion of its components designed as molded plastics such as ABS or Nylon. This allows for many aesthetic design possibilities and less expensive components.

Since the fulcrum design allows additional distance between the gas spring axis and the fulcrum, the adjustability range of the improved design is greatly increased over the prior art. The improved design can be adjusted to properly counter balance loads where the ratio of the heaviest load to the lightest load can be as much as 5 to 1. In a typical prior art design as previously described, this ratio rarely exceeds 2 to 1. This is a very large advantage, because it minimizes the requirement of the user to determine the weight of his video display before purchasing a supporting mechanism, and it allows the manufacturer to produce one unit that can support a wide range of loads, again reducing the cost of the manufacturing process.

The improved design creates a much preferred counter balancing moment due to its ability to continuously adjust the moment generated by the gas spring to more closely match that generated by the load as it is raised and lowered. In the previously described prior art mechanism, the counter balance moments generated by the mechanism do not closely match the requirements from the load. The improved design mechanism however, creates a continuously changing moment that varies proportionally with the angle of the arm. This removes the arm angle variable from the balancing requirement and allows a much closer match of counter balancing moments. This in turn eliminates the requirement to create additional friction in the mechanism. The improved design does not require any additional friction producing components. Therefore, the amount of force required by the user to reposition the load is significantly less than in other designs, making the repositioning of the load much easier. An additional, but not less significant, advantage of being able to closely match the counter balance moment generated by the gas spring to that required by the load, is the elimination of the tendency for the load to fade toward a lower position when it is in its uppermost position or to become over counter balanced and tend to rise when in its lowest position.

Further objects and advantages of my invention will become apparent from a consideration of the drawings and the ensuing descriptions

BRIEF DESCRIPTION OF THE DRAWINGS

FIG. 1 is an isometric view of a load support mechanism according to one embodiment of the invention including a typical load, and a typical anchoring arrangement;

FIG. 2 is an exploded isometric view of the load support mechanism of FIG. 1;

FIG. 3 is an isometric view of the main portion of the mechanism with a portion of a left housing and left arm removed to expose the internal components and details;

FIG. 4 is a partial bottom view of the arm assembly, showing the integral cord storage area;

FIG. 5 is a detailed view of a right arm showing internal details;

FIG. 6 is an exploded view of a ball and socket friction-producing arrangement and mounting plate;

FIG. 7 is an exploded view of an alternative embodiment of a load support mechanism;

FIG. 8 is a cross sectional view of a split ring assembly;

FIG. 9a is a force vs. displacement graph of one version of the support mechanism;

FIG. 9b is a force vs. displacement graph of an alternative version of the support mechanism;

FIG. 10a is a free body diagram of a first version of the arm, which corresponds to the force diagram of FIG. 9a;

FIG. 10b is a free body diagram of a second version of the arm with an offset load that corresponds to the force diagram of FIG. 9b; and FIG. 10c is a free body diagram of a second version of the arm according to an alternative embodiment.

DETAILED DESCRIPTION OF THE PREFERRED EMBODIMENT

For purposes of description herein, the terms forward, rearward, upward, and downward relate to the load support mechanism as oriented in FIG. 2 where the viewer's left side is considered the forward direction. As shown in FIGS. 1 & 2 the adjustable position load support mechanism includes an anchoring arrangement 10, a load counterbalancing arrangement 30, a housing assembly 20, an arm assembly 40, and a ball and socket friction producing arrangement 50 that includes a mounting plate 39 for the attachment of a load 100, which is in this case a typical video display device.

The anchoring arrangement 10 is comprised of a channel shaped member 12. To one of the channel flange surfaces 1 is rigidly attached a hollow cylinder 13. On the same axis as the cylinder and extending through the opposite flange is a threadable member 14 and a disk shaped pad 15 which engages against the bottom surface of a desk overhang to enable a clamping operation to be effected when a clamping handle 16 is rotated. The described anchoring arrangement represents one of several provisions that can be made for this load support mechanism, other arrangements that are envisioned include an anchoring arrangement on top of a surface with inadequate thickness or having a thickness in excess of the limitations of the clamping arrangement, by a weighted tripod arrangement. A bracketed anchoring arrangement 60 (FIG. 7) that anchors to a vertical surface such as a wall or typical office panel system is also envisioned. Other anchoring arrangements may be used.

A cable support ring 17 is disk shaped and is made from a flexible material such as flexible poly vinyl chloride (PVC). Ring 17 includes one large through hole 18 with a diameter such that it is slightly expanded when it is placed in any vertical location around cylinder 13. Hole 18, not being concentric with ring 17, allows an area for the addition of several smaller through holes 19, each with a thin slot 9 radiating from the center of holes 19 through the outer edge of ring 17. Ring 17 allows the user to temporarily attach and control several cables that are associated with the video display equipment that is suggested by the load support mechanism.

The housing assembly 20 is comprised of two separate components, housing right 22a, and housing left 22b. These components are mirror images with the exception of three assembly posts 51b, 52b, 53b used by screws 31a, 31b, and 31c respectively. Housing left 22b has indentions that allow the heads of screws 31a, 31b, and 31c, to be flush with or below the surface of housing left 22b, and holes of such dimension to allow the screws to pass through without interference. Housing right has three assembly posts 51a, 52a, and 53a, that are axially aligned with those on housing left 22b. The diameter of these three holes are such that screws 31a, 31b, and 31c will produce internal threads in housing right at assembly, therefore securing the attachment of housing right 22a to housing left 22b.

Both members 22a and 22b have an upper portion 41 that is generally triangular in shape and encompassing a lower portion 42 that is shaped as a semicircular extrusion with centerline axis 46. In the preferred embodiment these components are molded from any material of sufficient structural strength. Therefore, they are generally hollow shells with internal ribs. Near the lower portion of the semicircular extrusion is a rib 43 perpendicular to axis 46. Rib 43 contains a semicircular notch 44 concentric with axis 46. A semicircular groove 45 with a rectangular cross section extends around lower portion 42 between rib 43 and a closed end wall 110. At some distance above rib 43 and radiating at some specific angle is a slot 47. Near the area of transition from the upper portion 41 to the lower portion 42 is a rib 48 (FIG. 3) that includes a notch 49. Notch 49 loosely conforms to the cross sectional shape of load counter balancing arrangement 30. Above rib 48 and in alignment with axis 46 is a rib arrangement that produces a vertically oriented channel 24 (FIG. 2). A second rib arrangement that produces a horizontally oriented channel 21 roughly perpendicular to channel 24 is located approximately at the vertical midpoint of channel 24, and extending forward into the point of the triangular upper portion 41 of housing 22a and 22b. Channels 24 and 21 are on different planes. Each plane is offset a specific distance from axis 46. A section of the outer edge of the upper portion 41 of housing right 22a and housing left 22b is offset to align with the plane of channel 21 creating edge 54. A series of horizontal and vertical ribs 55 are incorporated to add structural strength and stability to channels 24 and 21. When housing 22a, and 22b are assembled it can be seen that they form a generally hollow structure with a cylindrical shaped lower portion 42 having circular ribs at 43 and 48, and a triangular shaped upper portion with opposing internal rib arrangements 24 and 21, an opening formed by edge 54 and a continuous assembly posts 51, 52, and 53.

Included in this support mechanism is a load counter balancing arrangement 30 comprised of an energy storage device, in this case a gas spring 27, a strap 28, and nut 29. Gas spring 27 incorporates a rod end clevis 56 with a mounting hole 57 and a threaded stud 58. Strap 28 is formed in the shape of a deep channel. The web section of the channel includes a hole 59 of sufficient diameter to accept stud 58 to which nut 29 is added to join strap 28 to gas spring 27. Near the upper edge of the flange portions of strap 28 are two holes 95 on a single axis. Mechanism 30 is connected to the housing assembly 20 by the joining of assembly posts 51a & 51b as they pass through hole 57.

The arm assembly 40 is comprised of components arm right 23a, arm left 23b, a moveable fulcrum 26, a threaded shaft 25, and a hand wheel 92. The two main arm components, arm right 23a and arm left 23b, are generally mirror images with the exception of the mounting posts 61a, 62a, 63a, 64a, 65a (FIG. 3) and their counterparts 61b, 62b, 63b, 64b, 65b, (not visible) and the shape of their edges in cable storage area 66a, and 66b as shown in FIG. 4. Arm left 23b (FIG. 2) has indentions that allow the heads of screws 32a, 32b, 32c, 32d, and 32e to be flush with or below the surface of arm left and corresponding through holes of such dimension to allow the threaded portions of the screws to pass through the holes without interference. Counterpart hollow posts on arm right 23a incorporate blind holes of such internal diameter that screws 32a, 32b, 32c, 32d, and 32e produce internal threads upon assembly of 23a and 23b therefore securing the attachment of arm right 23a to arm left 23b.

As shown in FIG. 4 the lower edges of arm right 23a, and arm left 23b are irregularly shaped such that when joined to produce arm assembly 40 create two circular openings 75 and 76 that are joined by a serpentine shaped slot 77. This arrangement allows the user to temporarily house a portion of the power and signal cables that accompany a typical video display unit.

As shown in FIG. 5, arms 23a and 23b are generally hollow in design and made from any molded material with the appropriate structural strength. Arm right 23a and arm left 23b are generally shaped as a channel with a rectilinear cross section throughout a rearward portion 69 and a tapering, generally semicircular cross section through a forward portion 70 terminating with an attached hemisphere 93. Located near the midpoint of the arm is an oblong through slot 67 whose axis is generally perpendicular to the longitudinal axis of the arm and flanked on each side by walls 73 and 74. Wall 73 has a semicircular notch 94.

Rectangular through slot 68 aligns generally parallel with the longitudinal axis of the arm. Slot 68 is enclosed by rib 103. Through the walls at the ends of slot 68 are semicircular notches 105 and 106 whose axis are aligned with the axis of notch 94. At the rearmost portion of rectangular slot 68 is wall 97 that is perpendicular to the axis of slot 68.

Arm rearward portion 69 terminates with offset area 71 that supports an externally protruding hollow cylindrical shape that creates arm axle 72 of specific diameter and length allowing it to extend through hole 95 and be captured in channel 24. Several additional ribs 81 add structural strength and stability.

A wall 83 offset some distance from a lower edge of arm right 23a and arm left 23b and encompassing an irregular edge shape 66 extends from wall 74 forward past the irregular shape 66 and terminates at the lower edge of the arm. This creates a cavity 84 to accept temporarily stored video power and signal cords.

A moveable fulcrum 26 is generally a cubic shape of such dimension to allow it to be loosely captured by slot 68 and its surrounding rib 103. From the sides of the cubic shape, extending outwardly are two cylindrical shapes forming axles 78 & 79 of such diameter and length that they extend into and are loosely captured by channel 21 (FIG. 2). Through the centerline of the cubic shape and perpendicular to the axis of axles 78 & 79 is a threaded hole 80 (FIG. 3).

A hand wheel 92 is rigidly attached to a threaded shaft 25. Shaft 25 is terminated in a flat end 82 and has threads that are equal in size to threaded hole 80 and of such a diameter to allow it to be loosely captured in the semicircular notches 94, 105, and 106 (FIG. 5) upon assembly. Wheel 92 has a protruding hub surface 96 (FIG. 3) such that the distance from the end of shaft 82 (FIG. 3) to hub surface 96 is loosely captured between walls 74 and 97 (FIG. 5). The outside diameter and thickness of wheel 24 are such that it protrudes through the oblong arm slot 67 without interference.

As shown in FIG. 6 a ball and socket friction producing arrangement 50 including a mounting plate 39 is assembled to encompass spherical shape 93. The ball and socket arrangement includes two identical ball clamps 34a, and 34b that include a spherical pocket 83 whose inside diameter matches that of hemisphere 93 and whose centerline lies some small distance off of flat surface 107, such that as clamps 34a and 34b are assembled to encompass hemispheres 93, surfaces 107 can not contact each other. Clamps 34a and 34b include a cylindrical boss 85 that contains a counter bored through hole 86 positioned such that the counter bore extends to surface 107. Also included in the ball clamp is an oblong depression 111 of such dimension to accept double threaded plate 36, compressible pad 35, and to allow the heads of clamping screws 33a and 33b to be recessed into the overall outline of clamp 34a. Clamps 34a and 34b incorporate two through holes 98 of such dimension to accept screws 33a and 33b.

The mounting plate 39 as envisioned is a square plate with 4 mounting holes 108 dimensioned in such a way to accept a standard mounting geometry supplied by a majority of video display manufacturers. Formed from the plate are ears 88 and 89. Through each ear is a hole 90 and 91 of such diameter to allow extended spring pins 37a and 37b to pass through the holes. The distance between the ears is such that it closely approximates the assembled overall length of the cylindrical bosses 85.

Enclosed in the counterbored holes upon assembly is a compressed spring 38 and two headed pins 37a and 37b that are of such dimension that their heads 87 are loosely contained in the counter bored portion of hole 86 but they can not pass through counterbored hole 86. The pins are of such length as to allow them to extend outwardly through holes 86 and through holes 90 and 91 in ears 88 and 89 of mounting plate 39 therefore axially constraining plate 39 to ball and socket friction producing arrangement.

DESCRIPTION OF OPERATION

In the preferred embodiment of the load support mechanism, the anchoring arrangement 10 is connected to a desk or work surface edge overhang by manipulation of members 14, 15 and 16 to apply a clamping force from the underside of the desk or surface. With the anchoring arrangement connected to the desk, the user is presented with a hollow vertical cylinder 13 into which he can insert the remaining assembly consisting of the housing assembly 20, which contains the load counterbalancing arrangement 30, arm assembly 40, and the ball and socket friction producing arrangement 50. With the assembly mounted as described, the arm assembly 40 will be forced by counterbalancing assembly 30 upwards such that the longitudinal axis of the arm makes an angle of approximately 45 degrees with the desk surface. This is due to the gas spring's normal position of full extension. In this position the outwardly projecting cylindrical axles 78 & 79 on arm right 22a and arm left 23b would be positioned at or near the lowermost limit of the vertical channel 24 and the adjustable fulcrum 26 and its axles 78 and 79 would be positioned at or near the rearmost position of the horizontal pocket 21.

The user can now remove the mounting plate 39 from the ball clamps 34a and 34b by depressing both pins 37a and 37b together, further compressing spring 38. With the mounting plate 39 free from the assembly, it can be mounted to the load 100, in this case a video display by use of the standard threaded fasteners arrangement provided by the display manufacturers. The video display with its attached mounting plate 39 can now be attached to the ball clamp arrangement by compressing pins 37a and 37b and releasing them to extend through the holes 90 and 91 in ears 88 and 89 completing the installation. At this time the arm assembly 40 may or may not be in a horizontal position. The user can move the arm into a nearly horizontal position by applying an upward or downward force, whichever is appropriate. While holding the unit in this position, the user can adjust the counterbalancing force by simply rotating the hand wheel 92 either clockwise to increase or counter clockwise to reduce the counterbalancing forces on the load. This adjustment is easily accomplished by hand without the use of tools, such as wrenches, etc. because the user is not required to add or subtract additional energy into the gas spring 27. The user's adjustment moves the fulcrum 26 either toward the load 100 and away from the gas spring, or toward the gas spring 27 and away from the load 100.

It can be seen by one skilled in the art that a relatively small movement in the position of the fulcrum 26 has a significant impact on the counterbalancing force due to the fact that as the fulcrum 26 is moved away from the gas spring 27 it not only increases the counterbalancing moment produced by the gas spring 27, but it also decreases the moment produced by the cantilevered load 100. Since this is the case, it can be seen that this position adjustable load support mechanism allows for a wide range of loads that can be counter balanced by the same energy storage device (in this case gas spring 27). In addition, since all of the moment-producing force vectors from the load are gravity produced, and therefore are always acting vertically, and the preferred embodiment of this system has the counterbalancing force from the gas spring 27 constrained in a vertical position due to vertical channel 24 throughout the loads range of motion, it can be seen that the generated load moments and counterbalancing moments remain in a proportional relationship. This relationship is not affected by the angle of the arm, because the position of the fulcrum 26 automatically moves horizontally as the load is moved vertically therefore allowing a larger range of motion to be obtained while still producing a useable counterbalancing force.

With the counterbalancing force adjusted properly for the individual load 100, the user can easily raise or lower the load 100 by applying a force on the load 100. This amount of force is very small because it only has to overcome the inherent internal friction in the gas spring, and the load will remain in that position when the force is removed. The horizontal motion is accomplished by rotating the load 100, the arm assembly, and the housing assembly 20 about axis 46, and the axis created by pins 37a, and 37b. The tilt of the load about a horizontal axis can be accomplished by rotating the pretensioned ball and socket friction producing arrangement about the centerline of the ball and socket joint.

The load in this improved mechanism is supported by a generally cantilevered arm arrangement. In order for the load to be counter balanced such that it will remain in its required position, the moment generated by the gas spring must be equal to the moment generated by the load and its distance from the fulcrum. The force generated by the load is due to gravity, therefore, it always acts vertically, and since the force from the gas spring is constrained by the vertical channel 24 it also acts vertically. Since these forces remain parallel, the moment created by each force varies as a function of its distance from the fulcrum multiplied by the cosine of the angle that each portion of the arm makes with a horizontal plane. These moments will remain in perfect balance as long as the center of gravity of the load, the fulcrum and the connection point of the gas spring to the arm all lie on the same axis, as shown in FIG. 10a.

A graphic representation of this constant force required by the gas spring is shown in FIG. 9a, by horizontal line #1. In this perfect condition of balance, any additional force or change in the load will change the vertical position of he load, which is not a useful condition for most applications, as some degree of position stability is required. In all energy storage devices however, including typical gas springs, the output forces are not constant and there is some amount of inherent friction. Line #2 represents a typical force vs. displacement curve produced by the non linear gas spring output, as it articulates. A graphical representation of the spring output, which includes the inherent friction, produces Line #3. By connecting the ends of these lines, we create a parallelogram of useable hysterisis in the diagram. Due to the design of the internal components of gas springs, both the amount of force variation (represented by the incline of lines #2 and #3) and internal friction, represented by the vertical distance between lines #2 and #3) can be adjusted by the manufacturer. It can be seen that in any position where line #1 (the required spring force) is enclosed by the hysterisis parallelogram, a balanced condition occurs. In order to reposition the load, an additional force of such magnitude to overcome the friction must be applied as shown by lines a and b. When the user adjusts the counterbalancing forces, by moving the position of the fulcrum, he equalizes the moments produced by the gas spring and the load. Graphically, this adjustment determines the vertical position of line #1. It can be seen that the margin for error in adjusting the counter balance can be relatively small, since the entire length of line #1 must reside inside the parallelogram. It can also be seen from line #4 that the mechanism can be adjusted and counterbalanced in several positions, yet it may depart from the counter balance condition at some other positions, as shown by section "c" of line #4, which lies outside the parallelogram.

The improved mechanism as shown in FIG. 10b, shows an arrangement where the center of gravity of the load, (represented by the hemispheres 66) is not aligned with the axis line connecting the fulcrum and the point where the gas spring connects to the arm. In this configuration, the hemispheres are offset above the axis by some predetermined angle 'x'.

FIG. 9b is a representation of the improved mechanism including the previously described angle "x". With the addition of this angle, the relationship of the cosine of the angles as previously described, are only proportional at one position. Graphically displayed (FIG. 9b), this angle creates a condition where the forces required from the gas spring to balance the load (line #5) are not constant as FIG. 9a (line #1). Therefore the graphical representation more closely matches the output of the gas spring (line #2). One of the advantages is that the internal friction in the gas spring can be less, and the corresponding forces a' and b', that are required to move the load are generally smaller. It can be seen that the improved design creates a much preferred counterbalancing moment due to its ability to continuously adjust the moment generated by the gas spring to closely match that generated by the load as it is repositioned.

FIG. 9c illustrates an alternative arrangement for the present invention in which the position of the gas spring and the fulcrum are reversed. The gas spring connection point is constrained to move in a horizontal channel or other type of constraint.

DETAILED DESCRIPTION OF AN ALTERNATIVE EMBODIMENT

There are occasions when due to existing furniture configurations it would be advantageous to be able to anchor the system to a wall or office panel system. There are other occasions where anchoring the system in an inverted position would also be helpful in space conservation, etc. With the use of a wall mounted or bracketed anchoring arrangement 60, both the previously described preferred embodiment, or this alternative embodiment can be used. Since it is evident to one skilled in the art to envision the wall anchoring of the preferred embodiment it will not be described.

An important alternative embodiment of the system is shown in FIG. 7. The overall assembly of the ball and socket friction producing arrangement 50 and the arm assembly 40 are as described in the preferred embodiment. In this alternative embodiment the housing assembly 20 and gas spring 27 are inverted. The previously described strap 28 and nut 29 are eliminated. Gas spring rod end clevis 56 is attached to the rearward ends of arm right 23a and arm left 23b by the addition of cross pin 99. Pin 99 has a diameter such that it is loosely controlled by the gas spring mounting hole 57 and the internal diameter of arm axle 72 on arm 23a and 23b. On the now upper end of gas spring 27, threaded stud 58 is supported and controlled by semicircular notch 44.

In FIG. 7 a typical office panel bracketed anchoring system 60 is shown. It consists of a vertical hollow cylinder 101 with an upper rim 109 connected to any number of notched flanges 104 that would be acceptable to a typical office panel configuration. The original cable support component 17 can be used as required. A circular split ring 102 with an "L" shaped cross section is used to lock the vertical position of the housing assembly 20 upon installation. FIG. 8. To install the inverted system, the bracketed anchoring arrangement 60 is rigidly attached to a vertical surface. The housing assembly 20 is then inserted upwardly through the cylinder 101 until the circular groove 45 is above the top edge of cylinder 101. Split ring 102 is expanded and forced into groove 45, in such a way as to allow the vertical portion of the inverted "L" shape to be inserted inside the cylinder 101. As the housing assembly 20 and ring 102 are lowered into position the flange portion of the ring contacts the upper rim 109 of the cylinder 101 and prevents the assembly 20 from further downward motion, without disrupting the ability of the assembly to rotate about axis 46.

Since the normal position of the gas spring 27 is extended it can be seen that arm assembly 40 will be forced to an upward position with respect to a desk surface in the same way as it is in the preferred embodiment. All of the user adjustability is retained as well as all of the system capability and functions.

Thus the reader will see that the position adjustable load support mechanism's of the present invention produce a highly functional yet economical device that provides the user with many advantages over the prior art.

While my above description contains many details these should not be construed as limitations on the scope of the invention but rather as an exemplification of one preferred embodiment thereof. Many other variations are possible. For example the gas spring energy storage device as stated could be replaced by a more conventional mechanical tension compression or constant force spring if the spring is accompanied by some type of friction producing device to create the necessary force vs. displacement hysteresis. Also the described embodiments illustrate a pair of linear perpendicular motion controlling channels in the housing components. There may be applications where these channels are neither linear nor perpendicular to each other nor parallel with the axis of the energy storage device. These variations may be made in order to maximize the effectiveness of the mechanism or as the result of a specialized design. Additionally the shape and size of the individual components could be varied to maximize their effectiveness aesthetically economically or functionally.

Accordingly the scope of the invention should be determined not by the embodiments illustrated but by the appended claims and their legal equivalents.

List of Reference Numbers

NO. Component
9 Slot
10 Anchoring arrangement
11 Channel flanged surface
12 Channel shaped member
13 Hollow cylinder
14 Threadable member
15 Disk shaped pad
16 Clamping handle
17 Cable support Ring
18 Large through hole
19 Small through hole
20 Housing assembly
21 Horizontal channel
22a. Housing Rt. b. Housing Left
23a. Arm Rt. b. Arm Left.
24 Vertical channel
25 Threaded shaft
26 Fulcrum
27 Gas spring
28 Strap
29 Nut
30 Load ct'bal arrangement
31a. b. c. Screws
32a. b. c. d. e. Screws
33a. b. Clamping screws
34a. b. Ball clamp
35 Compressible pad
36 Double threaded plate
37a. b. Pins
38 Spring
39 Mounting plate
40 Arm assembly
41 Upper portion of 40
42 Lower portion of 40
43 Semicircular rib
44 Semicircular notch
45 Semicircular groove
46 Housing CL axis
47 Slot
48 Rib
49 Notch
50 Ball & Socket friction producing arrangement
51a. b. Assembly post
52a. b. Assembly post
53a. b. Assembly post
54 Offset edge
55 Vert. and Hor. ribs
56 Rod end clevis
57 Mounting hole
58 Threaded stud
59 Strap hole
60 Bracketed anchoring arrangement
61a. b. Assembly post
62a. b. Assembly post
63a. b. Assembly post
64a. b. Assembly post
65a. b. Assembly post
66 Cable storage area
67 Slot
68 Slot
69 Arm rearward
70 Arm forward
71 Offset area
72 Arm axle
73 Wall
74 Wall
75 Circular opening
76 Circular opening
77 Serpentine slot
78 Axle
79 Axle
80 Threaded hole
81 Ribs
82 End of shaft
83 Spherical pocket
84 Cable support cavity
85 Cylindrical boss
86 Counter bored hole
87 Pin head
88 Ear
89 Ear
90 Hole
91 Hole
92 Hand wheel
93 Hemisphere
94 Notch
95 Strap hole
96 Protruding hub
97 Wall
98 Screw hole
99 Cross pin
100 Load
101 Hollow cylinder
102 Split ring
103 Rib
104 Notched flange
105 Notch
106 Notch
107 Flat surface 108 Mounting holes
109 Cylinder upper rim
110 Closed end wall
111 Oblong depression

We claim:

1. A position adjustable load support mechanism comprising:
   an arm having first and second ends, said arm being supported at least partially by a movable fulcrum;
   a constraint adapted to constrain the movement said fulcrum;
   an attachment mechanism positioned adjacent said first end of said arm, said attachment mechanism adapted to support a load; and
   a force-producing device coupled to said arm;
   said force-producing device, said constraint, said arm and said movable fulcrum being arranged such that the moments of force produced by the load and by the force-producing device are automatically counterbalanced over a plurality of different orientations of said arm, wherein said fulcrum is positioned along said arm between said force-producing device and said attachment mechanism.

2. The position adjustable load support mechanism of claim 1, further including a means to adjust the position of the fulcrum relative to the position of the force-producing device.

3. The position adjustable load support mechanism of claim 1, further including a means to adjust the position of the fulcrum relative to the position of the force-producing device without the use of tools, the adjustment of the position of the fulcrum providing automatic counterbalancing for different loads supported by said attachment mechanism.

4. The position adjustable load support mechanism of claim 1, further including a means to control the motion of the arm such that said arm has a continuously varying center of rotation.

5. The position adjustable load support mechanism of claim 1,
   further including a means to control the motion of the force-producing device such that its force vector remains generally parallel to that of the vector produced by the load.

6. The position adjustable load support mechanism of claim 1, wherein said attachment mechanism is adapted to support an electronic display.

7. The position adjustable load support mechanism of claim 1, wherein said constraint is a channel oriented generally horizontally and said force-producing device produces a force that is oriented generally vertically.

8. The position adjustable load support mechanism of claim 1, wherein said force-producing device is a gas spring.

* * * * *

UNITED STATES PATENT AND TRADEMARK OFFICE
CERTIFICATE OF CORRECTION

PATENT NO. : 6,857,610 B1  
APPLICATION NO. : 10/313492  
DATED : February 22, 2005  
INVENTOR(S) : John P. Conner and Robert L. Russell It is certified that error appears in the above-identified patent and that said Letters Patent is hereby corrected as shown below:

Column 1:  
Line 12, "," should be --.-- after "(LCD)".  
Line 12, after "(LCD)." make remaining a new paragraph starting with --A worker at--.

Column 4:  
Line 41, "1" should be --11--.

Signed and Sealed this

Thirteenth Day of May, 2008

JON W. DUDAS  
*Director of the United States Patent and Trademark Office*